UNITED STATES PATENT OFFICE.

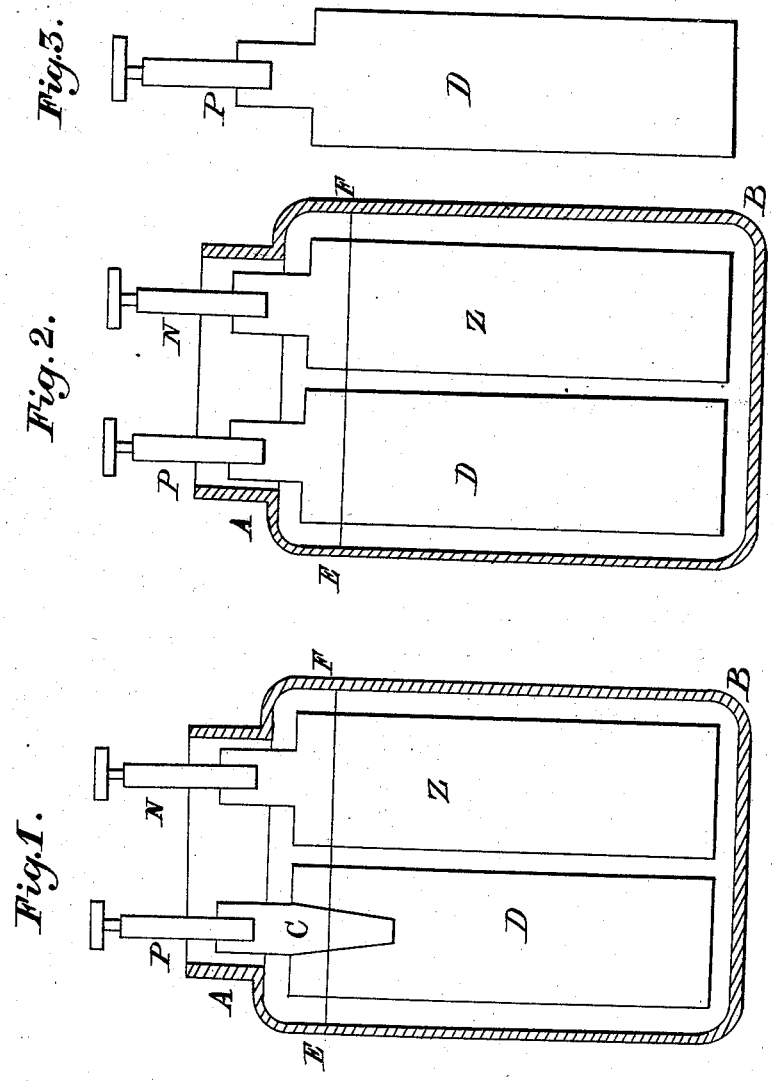

GEORGE L. LECLANCHÉ, OF PARIS, FRANCE, ASSIGNOR TO HILBORNE L. ROOSEVELT.

IMPROVEMENT IN GALVANIC BATTERIES.

Specification forming part of Letters Patent No. 165,452, dated July 13, 1875; application filed December 16, 1874.

*To all whom it may concern:*

Be it known that I, GEORGE L. LECLANCHÉ, of Paris, in the Republic of France, have invented an Improvement in Galvanic Batteries; and the following is a full and exact description thereof, reference being had to the accompanying drawings and references marked thereon, which constitute a part of this specification.

All forms of galvanic battery known up to the present time consist, essentially, of an active element, such as zinc, iron, magnesium, or the like, which, by reason of its superior affinity or attraction for one of the constituents of a compound of fluid, decompose the latter, taking to itself one of its components, together with one of the electric fluids, and repelling the other component and the other fluid.

In order that this other fluid should be collected and removed from the liquid, so that in due course it may circulate through wires and the like, and return to the active element at last in regular circuit, it is necessary that some collector, outward road, or way of egress be provided for it. This demands simply a good conductor, not capable of acting on the fluid, and thus opposing the action of the first-named element. For this purpose many good conductors have been and are employed, such as copper, silver, platinum, or dense carbon in plates or rods, all, however, being without any chemical reaction with the fluid compound, by which the power of the electric current is increased. They act simply as collectors and means of outlet to the electric fluid, and are thus very appropriately called negative elements. All the force which such a combination or battery can, by any possibility, develop is derived from the attractive force of the active element for the constituent of the fluid with which it combines; but it is evident that this must, in all cases, be opposed and diminished by the mutual attraction between the constituents of the fluid, since this last must be ruptured or overcome in order that the attraction between the solid element and single constituent of the fluid should have play.

Various practical considerations render it necessary for me in most cases to employ, in contact with the active element of a battery, a fluid difficult to decompose, because of a strong mutual attraction between its constituents, such as water, and I therefore lose the greater part of the force developed by the combination with the active element in doing this work of separation.

To overcome this drawback one of the most successful ways is to surround the negative element with some substance easy to decompose, and whose separation shall take the place of that of the other fluid. Such a substance is frequently called a depolarizing body, and may be a solid, a liquid, or a gas.

The exact *modus operandi* by which this result is reached can be best understood by an example. Suppose the positive element to be a plate of zinc, the liquid on which it acts, water, and the second compound or depolarizing body to be chromic acid, restrained from freely mingling with the water, for reasons of detail, by a porous partition. The zinc combines with the oxygen of the water, developing a great amount of force, most of which, however, is expended in getting the oxygen away from the hydrogen, with which it was combined in water. The ousted hydrogen, however, repelled from the zinc, travels toward the negative element, and soon comes in contact with the chromic acid. In this it finds oxygen combined feebly with chromium, and it therefore replaces its lost oxygen, of which the zinc had deprived it, by seizing upon that of the chromic acid. This union of hydrogen and oxygen again develops just as much force as was expended in the corresponding decomposition of the water and expulsion of hydrogen by the zinc; but I must still allow for the force lost in decomposing the chromic acid. To express these actions in a mathematical form, let 10 be the force of union between the zinc and oxygen, and 9 the force of union between oxygen and hydrogen, and consequently the power needed to separate them; then $10-9=1$ would be the maximum available force from such an arrangement alone. Now, however, suppose that the hydrogen displaced as above were to combine with oxygen taken from chromic acid, which combining force was 3, and which, therefore, would only require a force of 3 to separate it; the series would then be $10-9+9-3=10-3=7$.

Such being the "rationale" of the use of a second compound body in a galvanic battery, I next describe the method of its use. In the first place it must in all cases be kept out of contact with the active element for many reasons connected with the detail of its practical action, among which I may mention as chief this, that its very ease of separation which recommends it for use would cause a too violent and irregular combination between the active element and the compound if they were in immediate contact. To keep these two apart, if the second compound is a liquid, some partition is required sufficiently pervious to allow the displaced constituent to travel through, and yet so impervious as to restrain the second compound from diffusing through into the fluid on which the active element operates. Porous earthenware is commonly used for this purpose, though animal membrane, or its equivalent, and other porous bodies have been employed. In all cases, however, the porous cell or diaphragm opposes a very considerable resistance to the transfer of the electric and ponderable fluids, and is thus a source of loss, as being a resistance to be overcome, which force must be expended.

It is, therefore, the object of the present invention so to consolidate any insoluble or partially soluble substance, such as metallic oxide or peroxide, chromate, sulphate, sulphide, chloride, manganate, or other equivalent compound easy of chemical decomposition, as to set free from itself an electro negative chemical element, which substance I term in this specification a depolarizing substance; that the same, either alone or mixed with carbon or other good conductor, with or without a cementing substance, may form a solid mass fit to serve as itself the negative element or outward road for the electric current, thus dispensing with the necessity of any porous cup or diaphragm, and not only simplifying the battery by reducing its number of parts, but also improving its efficiency by the removal of a source of resistance and loss.

To accomplish this purpose, I take the metallic oxide or peroxide, chromate, sulphate, sulphide, chloride, manganate, or other equivalent compound capable of readily giving up oxygen or other negative chemical element, and reduce it to a fine powder—this either alone or mixed with dense carbon or other chemically inactive good conductor, and, if necessary, with a small portion—between five and ten per cent.—of some cementing substance, such as pitch, tar, bitumen, resin, paraffine, wax, albumen, gelatine, silicate, gum, collodion, alumina, or other equivalent substance. These, or such of them as are used, being in a uniform fine powder, are placed in a mold, and, by hydraulic pressure or otherwise, are submitted to a very great compressive force, by which a hard, compact, and resistant mass is obtained.

As an example, I apply this invention to galvanic batteries in which the negative element is carbon surrounded by peroxide of manganese. I reduce the peroxide of manganese and carbon to a powder, more or less fine, and mix them in about equal proportions. To this mixture I add a small quantity—from five to ten per cent.—of some cementing substance, such as resin. I then place the whole in a heated mold furnished with a compressing-piston, and submit to a high pressure by the hydraulic press, by which means it is changed into a solid negative element, dispensing entirely with the necessity of a porous cup.

Further to illustrate this application, the accompanying drawing is attached, in which Figure 1 represents a "cell" or "cup" of a galvanic battery, A B being the containing-vessel, filled to the level, E F, with the dielectric or active fluid, such as chloride of ammonium or the like. Z is the plate of zinc or active element, having connected with its upper end a binding-screw, N, which answers to the negative pole or cathode of this combination. D represents the new negative element and depolarized solid body, as hereinbefore defined, with a blade or core of carbon, C, as a conductor, to establish connection with the binding-screw P, which represents the positive pole or anode in this combination. Fig. 2 represents the cell arranged as in Fig. 1, except that the blade or core of carbon is omitted, and the binding-screw P is connected directly with a prolongation of the combined negative element and depolarizing body D. Fig. 3 represents the combined negative element and depolarizing body, which is the subject of this patent.

I claim, and wish to secure by Letters Patent, viz:

1. A galvanic battery in which the use of a porous cup is dispensed with, and in which an insoluble or slightly soluble depolarizing substance, as above defined, rendered solid, (with or without cement, by pressure,) is combined with a conductor and negative pole, substantially as and for the purposes set forth.

2. A depolarizing body for connection with the negative pole of a galvanic battery, consisting, in whole or in part, of an insoluble or slightly soluble depolarizing substance, rendered solid, with or without cement, by pressure in a mold, substantially as and for the purposes set forth.

3. A galvanic battery in which the use of a porous cup or diaphragm, or its equivalent, is dispensed with, and in which the negative element consists of a mixture of an insoluble or slightly soluble depolarizing substance, as hereinbefore defined, and a conductor, with or without cement, rendered solid by pressure, substantially as and for the purposes set forth.

4. A negative element for a galvanic battery, consisting, in whole or in part, of a mixture of insoluble or slightly soluble depolarizing substance, as above defined, and a conductor, with or without cement, rendered solid by pressure in a mold, substantially as and for the purposes set forth.

GEORGE L. LECLANCHÉ.

Witnesses:
ROBT. M. HOOPER,
DAVID T. S. FULLER.